United States Patent [19]
Tanaka et al.

[11] Patent Number: 5,521,714
[45] Date of Patent: May 28, 1996

[54] ROTARY HEAD TYPE REPRODUCING APPARATUS

[75] Inventors: Masato Tanaka; Nobuhiko Watanabe, both of Tokyo, Japan

[73] Assignee: Sony Corporation, Tokyo, Japan

[21] Appl. No.: 327,482

[22] Filed: Oct. 21, 1994

Related U.S. Application Data

[63] Continuation of Ser. No. 11,426, Jan. 29, 1993, abandoned.

[30] Foreign Application Priority Data

Jan. 30, 1992 [JP] Japan ..................... 4-038384

[51] Int. Cl.$^6$ ............................. H04N 5/7824
[52] U.S. Cl. ........................ 358/338; 360/72.3
[58] Field of Search .................. 358/335, 338, 358/340, 337; 360/61, 62, 72.3, 73.12, 75, 84, 33.1, 73.08; H04N 5/7824

[56] References Cited

U.S. PATENT DOCUMENTS 4,366,371  12/1982  d'Alayer de Costemore d'Arc et al. ................... 360/72.3
4,794,472  12/1988  Doyama .................. 360/73.08

FOREIGN PATENT DOCUMENTS 399812  11/1990  European Pat. Off. .

*Primary Examiner*—Thai O. Tran
*Assistant Examiner*—Huy Nguyen
*Attorney, Agent, or Firm*—Jay H. Maioli

[57] ABSTRACT

In a rotary head type reproducing apparatus, such as a digital audio tape recorder (DAT), a display changeover operation, a key scanning operation or a sensor scanning operation is inhibited during the periods $T_{PB-A}$, $T_{PB-B}$ when a rotary head is in contact with a magnetic tape for reproducing signals, and the display changeover operation is performed during time periods $T_{DS1}$ to $T_{DS4}$ outside of these periods $T_{PB-A}$, $T_{PB-B}$, while the scanning operations are performed during a time period $T_{SC}$. An error rate may be improved because noises due to display changeover or scanning may be eliminated during the time the magnetic head is contacted with the magnetic tape for signal reproduction. The result is that shielding or the like may be eliminated and the display section of switches may be mounted in proximity to the rotary head to reduce the size of weight of the apparatus.

3 Claims, 4 Drawing Sheets

ROTARY HEAD TYPE REPRODUCING APPARATUS

This is a continuation of application Ser. No. 08/011,426 filed Jan. 29, 1993, now abandoned.

BACKGROUND OF THE INVENTION

1. Field of the Invention

This invention relates to a rotary head type reproducing apparatus, such as a digital audio tape recorder (DAT), employing a rotary head device.

2. Description of the Related Art

There are currently known a variety of kinds of apparatus for recording and reproducing audio or video signals on or from a magnetic tape using a rotary head device, such as an apparatus described in U.S. patent application Ser. No. 624,393, filed on Dec. 7, 1990. With the digital audio tape recorder employing the rotary head device, as described in the pending application, if the voltage or current at an input or an output is changed during the time when the rotating magnetic head is contacted with the magnetic tape for reproduction, there is a risk that noise is mixed into playback signals. That is, noises tend to be intruded into the magnetic head or the playback RF amplifier during switching of the operating states of a large number of light emitting diodes (LEDs), a liquid crystal device (LCD) or fluorescent segments (FL) or during scanning of a switch matrix, when the magnetic tape is contacted with the drum, as in the case when the switching or scanning operation is carried out in non-synchronism with the drum rotation. Above all, if the apparatus is of an ultra-small size, the magnetic head has to be mounted in close proximity to the display elements or switches to render it difficult to inhibit noise intrusion.

Although the problem is not felt so keenly during recording when the recording signal current is larger, even the slightest noise intrusion tends to deteriorate the S/N ratio during reproduction when the playback signal current is low. This noise is amplified and rendered more perceptible to the eyes or to the auditory organ.

OBJECT AND SUMMARY OF THE INVENTION

It is an object of the present invention to provide a rotary head type reproducing apparatus whereby the noise generated by turning on or off of the display LEDs, LCD or FLs during signal reproduction by the rotary head or during scanning of sensors or a switch matrix may be prevented from being introduced into the magnetic head or amplifier.

The present invention provides a rotary head type reproducing apparatus for reproducing signals from a recording medium, using a rotary head intermittently contact with the recording medium, comprising synchronizing means for synchronizing rotation of the rotary head with a timing generating operation by the timing generator, and control means for inhibiting the operation of changing the voltage or current at an input or an output during the time interval when the rotary head is contact with the recording medium for reproducing the signals.

With the present rotary head type reproducing apparatus, display changeover operations at an input or an output or the operations of scanning the keys or sensors are inhibited by controlling means during the time when the rotary head is contact with the magnetic tape as the recording medium, whereby noises generated by these changeover or scanning operations may be prevented from being intruded into the magnetic head or the amplifier.

Other objects and advantages of the present invention will become clear from the following description of the preferred embodiments and the claims.

DETAILED DESCRIPTION OF THE DRAWINGS

DETAILED DESCRIPTION OF THE PREFERRED EMBODIMENT

Figure 1:
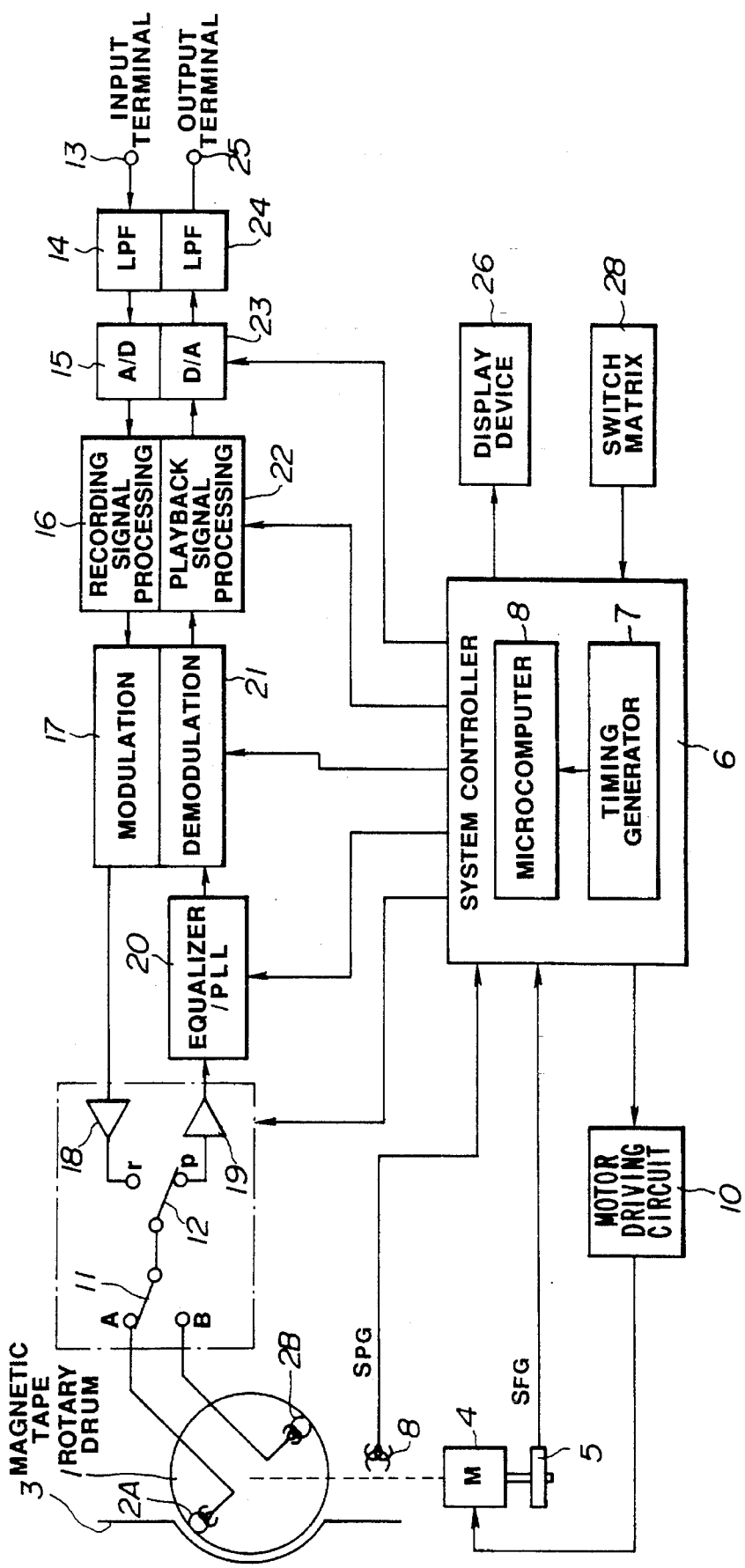
FIG. 1 is a block diagram showing a schematic arrangement of a digital audio tape recorder to which the present invention is applied.

Referring to FIG. 1, a digital audio tape recorder, which is a reproducing apparatus constructed using a rotary head according to the present invention is explained in detail.

With the present digital audio tape recorder, a rotary drum 1 of a rotary head device is rotationally driven at e.g. 50 Hz (at a rate of 50 revolutions per second). A pair of magnetic heads 2A, 2B are mounted on the rotary drum 1 at an angular interval of e.g. 180°, and a magnetic tape 3 is wrapped obliquely around these magnetic heads over an extent of e.g. 90° so as to travel at a predetermined travelling velocity. These magnetic heads 2A, 2B alternately scan the magnetic tape 3 for forming inclined recording tracks on the tape. The magnetic gaps of the magnetic heads 2A, 2B are set at different angles from each other.

The rotary drum 1 is rotationally driven by a drum motor 4, a rotary shaft of which is fitted with a frequency generator (FG) 5. The frequency generator (FG) 5 generates a signal $S_{FG}$ having a frequency corresponding to the rotational velocity of the drum to transmit the signal to a system controller 6. A pulse generator (PG) 8 generates a rotation detection pulse signal $S_{PG}$ at a predetermined rotational phase each time the rotary drum 1 completes one complete revolution. The rotation detection pulse signal $S_{PG}$, which is a rotational phase detection pulse signal, or PG signal, is generated at a start timing of scanning of the magnetic tape 3. The PG signal $S_{PG}$ is supplied to system controller 6. System control let 6 is responsive to the FG signal $S_{FG}$ and the PG signal $S_{PG}$ to form a motor control signal which supplied as a control signal to a drum motor 4 via an motor driving circuit 10. The drum motor 4 is controlled to be rotationally driven at a rate of 50 revolutions per second so that the PG signal $S_{PG}$ is synchronized with a predetermined synchronization signal.

The magnetic heads 2A, 2B are alternately switched by a head changeover switch 11 so that recording signals from a terminal r of a recording/play switch 12 are supplied via a rotary transformer, not shown, to the magnetic heads 2A, 2B, while playback signals from the magnetic heads 2A, 2B are taken out via another rotary transformer, not shown, at a terminal p of the recording/play switch 12. Analog/audio signals from an input terminal 13 are supplied via a low-pass filter (LPF) 14 to an A/D converter 15 so as to be converted into digital audio signals which are transmitted to a recording signal processing circuit 16. The recording signal processing circuit 16 processes the digital audio signals by, for example, error detection, code appendage for error correction, interleaving and time base compression. Output signals from the processing circuit 16 are supplied to a modulating circuit 17 for being converted into signals suitable for recording. Recording signals from the modulating circuit 17 are supplied via a recording amplifier 18 and a terminal r of the recording/play switch 12 to the head changeover switch 11 whereby the recording signals are alternately supplied to the magnetic heads 2A, 2B. Signals reproduced by the magnetic heads 2A, 2B are transmitted via head changeover switch 11 and a terminal p of the recording/play switch 12 to a playback amplifier 19. Output signals from playback amplifier 19 are transmitted via an equalizer/PLL circuit 20 to a demodulation circuit 21 for demodulation before being transmitted to a playback signal processing circuit 22. The playback signal processing circuit 22 processes the demodulated output signals by, for example, time base expansion, deinterleaving, error correction or concealment. Output signals from the processing circuit 22 are transmitted to a D/A converter 23 for being converted into analog signals. Playback audio signals from D/A converter 23 are outputted via a low-pass filter (LPF) 24 at an output terminal 25.

A variety of timing signals are gene rated by the system control let 6 comprised of a timing generator 7 and a microcomputer 8 for controlling switching timing of the head changeover switch 11, recording/play switch 12 or other circuitry. System control let 6 also takes charge of display control of a display device 26, key scanning of a set of switches, or switch matrix, 28 or sensor scanning.

A concrete embodiment of the present invention, as applied to a digital audio tape recorder having the arrangement as shown in FIG. 1, is hereinafter explained.

Figure 2:
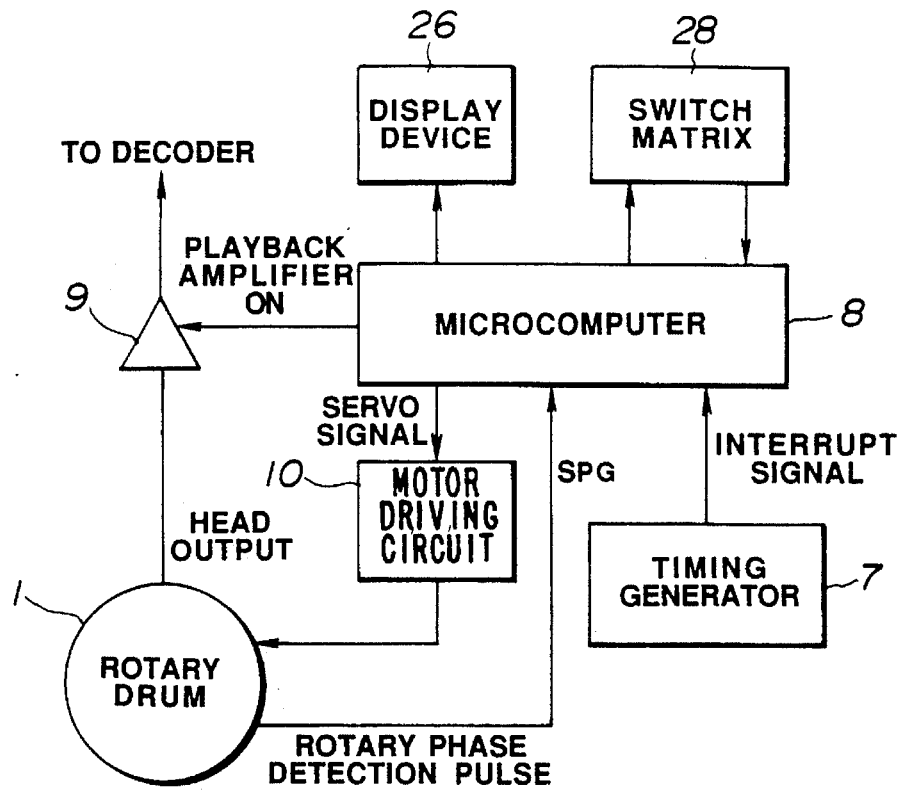
FIG. 2 is a block diagram showing essential portions of the digital audio tape recorder shown in FIG. 1.
Figure 3:
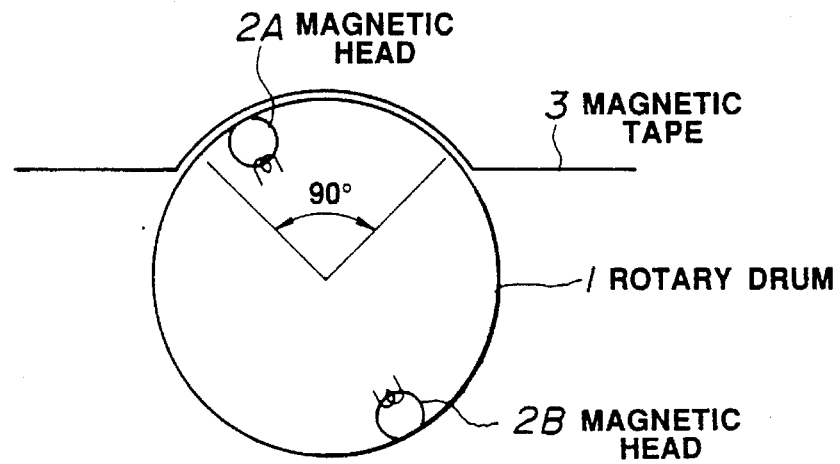
FIG. 3 is a schematic view for explaining a rotary head applied to a digital audio tape recorder according to the present invention.

FIG. 2 shows, as an embodiment of a rotary head type reproducing apparatus according to the present invention, a schematic arrangement of a small-sized rotary head type digital audio tape recorder (DAT). FIG. 3 shows, in a schematic view, a rotary head applied to a DAT shown in FIG. 2. The details of these components may be constructed as shown in FIG. 1 and are not shown herein for avoiding redundancy.

Referring to FIGS. 2 and 3, the microcomputer 8 detects the time difference between the PG pulse signals $S_{PG}$ (rotational phase detection pulse signals) obtained upon detection of the rotational phase of the rotary drum 1 of DAT and an interrupt signal from timing generator 7 for transmitting a servo signal via the motor driving circuit 10 to a drum motor for applying a servo to the drum motor so as to maintain a constant phase relation between the rotational phase of the drum and the phase of the timing generator 7.

Figure 4:
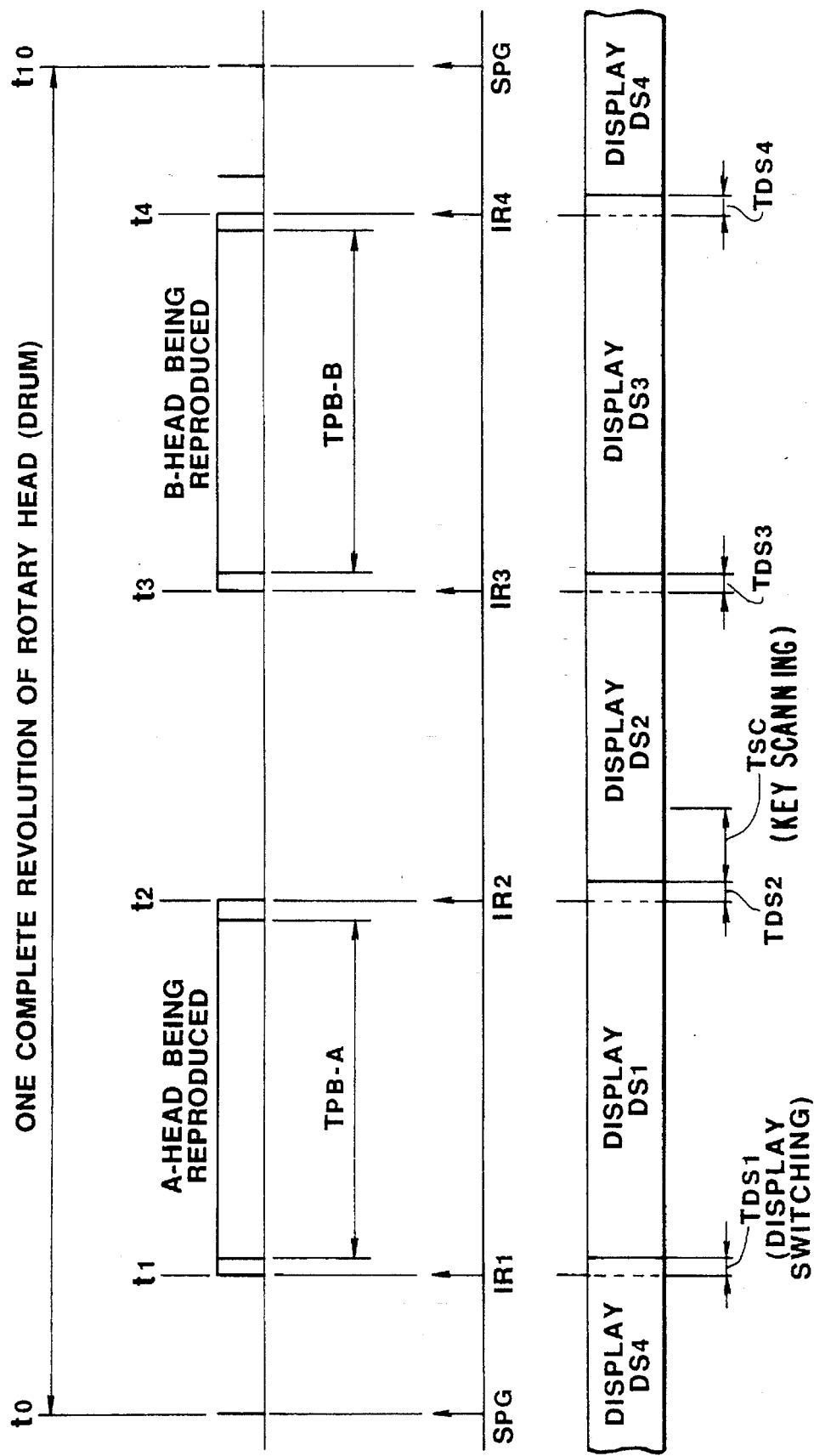
FIG. 4 is a timing chart for illustrating the operation of he digital audio tape recorder to which the present invention is applied.

Referring to FIG. 4, which is a timing chart for illustrating the operations of various component parts during one complete revolution of a rotary head, the above-mentioned PG pulse signals (rotational phase detection pulse signals) $S_{PG}$ are generated at time points $t_0$, $t_{10}$, the time interval between time points $t_0$ and $t_{10}$ corresponding to one complete revolution of the rotary drum 1. The timing generator 7 generates interruption signals $IR_1$, $IR_3$ at time points $t_1$, $t_3$ of turning on of a playback amplifier 9, while generating interruption signals $IR_3$, $IR_4$ at time points $t_2$, $t_4$ of turning off of the playback amplifier 9. Within the time intervals of $t_1$ to $t_2$ and $t_3$ to $t_4$, there are provided a time period $T_{PB-A}$ during which signals are actually reproduced by the magnetic head 2A (FIG. 3) and a time period $T_{PB-B}$ during which signals are actually reproduced by the magnetic head 2B (FIG. 3), respectively. That is, a magnetic tape 3 is wrapped around the rotary drum 1 by an extent slightly larger than 90°, such that the above-mentioned playback time intervals $T_{PB-A}$, $T_{PB-B}$ represent the time intervals during which the magnetic heads 2A, 2B are actually contact with the magnetic tape 3 and which correspond to rotation by one-fourth of a full revolution through 360°, or by 90°, of drum 1.

During display changeover periods $_{DS1}$, $T_{DS2}$, $T_{DS3}$, $T_{DS4}$, directly after these interrupt signals $IR_1$, $IR_2$, $IR_3$, $IR_4$, display contents or dynamic illumination of display device 26 are changed over by microcomputer 8. It is noted that the display changeover periods $T_{DS1}$, $T_{DS3}$ are terminated before the start periods of the playback time periods $T_{PB-A}$, $T_{PB-B}$ without being overlapped with these playback time periods. It is also noted that a key scanning period $T_{SC}$ is provided after the display changeover period $T_{DS2}$ directly following interrupt signal $IR_2$ so that the key scanning for the switch matrix 28 or the sensor scanning is carried out during this key scan period $T_{SC}$ by microcomputer 8 for reading the contents of the switches and sensors.

Meanwhile, the display contents or dynamic illumination need not be changed over for each of the four display changeover periods $T_{DS1}$, $T_{DS2}$, $T_{DS3}$, $T_{DS4}$ per each complete revolution, and it suffices to carry out display changeover once each complete revolution or once for several complete revolutions. These time periods $T_{DS1}$ to $T_{DS4}$ may also be used for key scanning or sensor scanning operations. The time period directly following the ends of the playback time periods $T_{PB-A}$, $T_{PB-B}$, or the time periods when the playback amplifier 9 is turned off, that is the time period since $t_2$ until $t_3$ or the time period since $t_4$ until the start time point of the next period of revolution $t_1$, may naturally be employed as the permitted time for carrying out the above-mentioned display changeover operation or the scanning operation.

In this manner, there is no risk of noise generation from the display device 26 or a line connected thereto due to changes in display or from the switch matrix 28 or a line connected thereto due to the key scanning or sensor scanning operation during the time periods $T_{PB-A}$, $T_{PB-B}$ when the magnetic heads 2A, 2B are actually contact with the magnetic tape 3. Consequently, noise intrusion into the magnetic heads 2A, 2B, playback amplifier 9 or playback signal line may be prevented to eliminate S/N deterioration for improving an error rate. The result is that a shielding for noise elimination may be dispensed with, while it becomes possible to mount the display device 26 or the switch matrix 28 in proximity to the rotary head for reducing the size or weight of the reproducing apparatus.

Meanwhile, it is also desirable that the operations possibly leading to fluctuations in voltage or current to affect the playback signals, besides the above-mentioned display changeover operations of scanning operations, and including various input and output operations, be carried out during time periods other than the reproducing periods $T_{PB-A}$, $T_{PB-B}$. During recording, it is also desirable that input and output operations possibly leading to voltage or current fluctuations be inhibited during the time periods when the magnetic head is in contact with the magnetic tape for carrying out actual recording operations, although the recording signals are affected to a lesser extent by these input or output operations.

In the above embodiment, the rotary drum (driving motor) is servo-controlled as a method for maintaining a constant relation between the rotational phase of the drum and the phase of the timing generator. As a modification, it is also possible to effect timing control of a timing generator responsive to the rotational phase or the rotational velocity of the drum (rotary head) for locking the timing signal from the timing generator itself with respect to drum rotation.

Figure 5:
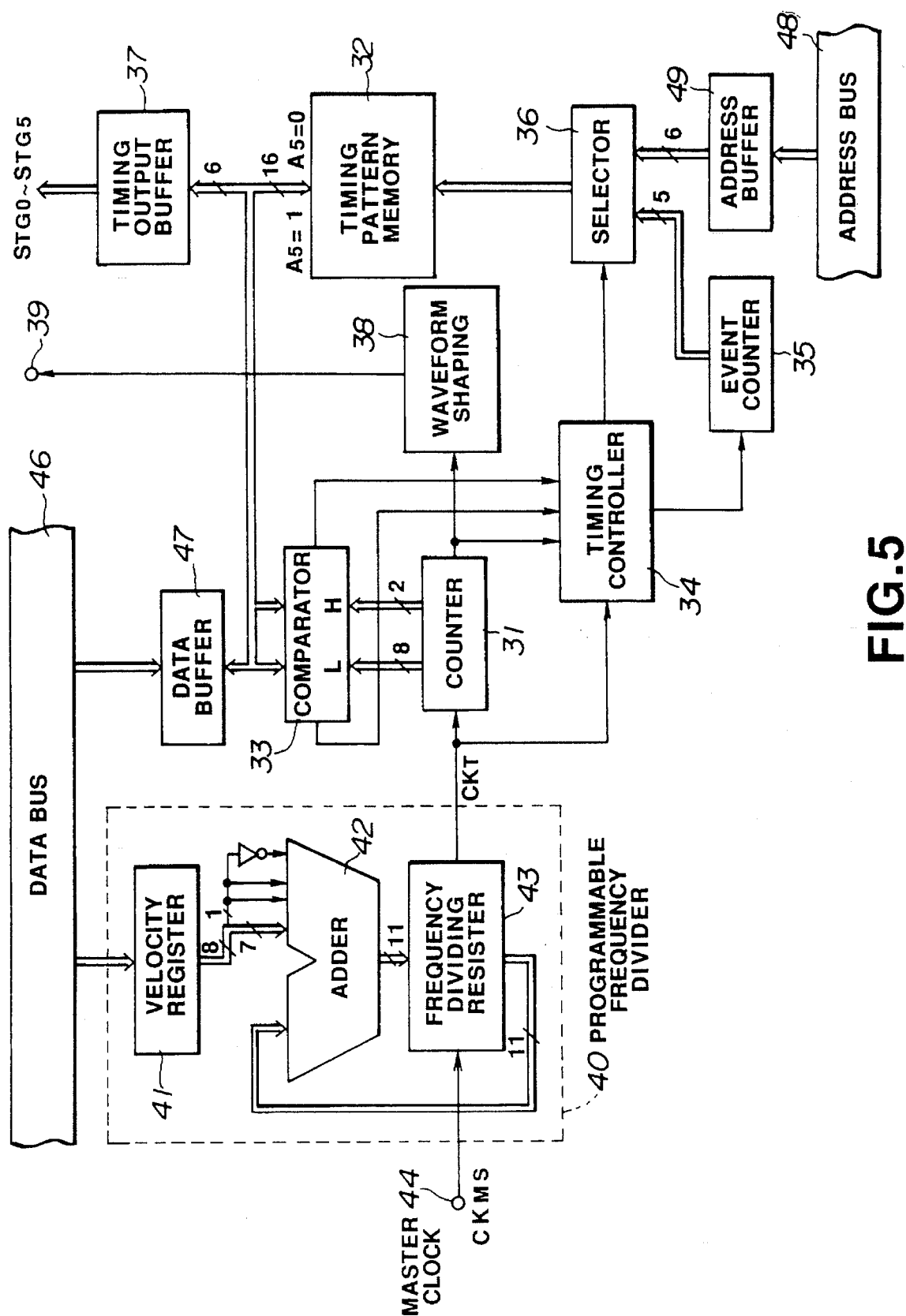
FIG. 5 is a schematic block diagram showing a modified embodiment of the rotary head type reproducing apparatus according to the present invention.

FIG. 5 shows an embodiment in which the period of timing generation is controlled responsive to the rotational velocity of the drum (rotary head). With the present embodiment, the timing generator is controlled not only by the phase information but also by the velocity information of the rotary head. For example, the phase of the signal TG indicating the start point of timing generation with respect to PG pulse signals SPG (target phase) is corrected, while the period of the timing generation is variable (programmable) and controlled depending on the velocity information.

That is, in the embodiment shown in FIG. 5, the above-mentioned programmable timing generator is built into a one-chip microcomputer system. The timing generator includes, as main components, a time base counter 31 having the count number for one period of the rotary head as its maximum countable bits, a timing pattern memory 32 having stored therein data for generating various timing patterns, and a programmable frequency divider 40 for controlling clocks of the counter 31 responsive to the above-mentioned velocity information. An output of counter 31 and an output from timing pattern memory 32 are compared to each other in a comparator 33. A comparison output of comparator 33 is supplied to a timing controller 34, an output of which is supplied to an event counter 35 and a selector 36. An output of event counter is supplied via the selector 36 to timing pattern memory 32.

A static RAM (random access memory) is usually employed as timing pattern memory 32 and has for example a storage capacity of 64 bytes or 32 words, each word consisting of 6 bits of output data and 10 bits of time base data. The time base data correspond to the count value of time base counter 31. When the time (phase and position) indicated by counter 31 coincides with the time base data, the respective 6 bits of the output data become respective timing output signals $S_{TG0}$ to $S_{TG5}$. That is, six timing patterns, when the timing from counter 31 becomes the above-mentioned time base data, are stored as respective bits of the above-mentioned 6-bit output data.

The velocity information obtained upon detecting the rotational velocity of the rotary drum 1 of FIG. 2 is processed by e.g. a microcomputer to generate variable or programmable velocity information for frequency division, which programmable velocity information is supplied over data bus 46 to a velocity register 41. The above-mentioned programmable velocity information from velocity register 41 is in the form of 2's complement data in an 8-bit, configuration (−128 to +127) which is transmitted to an adder 42 after, if necessary, bit expansion. An output from adder 42 is returned to adder 42 via a frequency dividing register 43. The register 43 is fed via an input terminal 44 with master clocks $CK_{MS}$ which are frequency divided at a frequency division ratio r which is changed depending on the above-mentioned velocity information to generate count clocks $CK_T$ for time base counter 31. If the above-mentioned velocity information for programmable frequency division is $N_{SP}$, the frequency division ratio r is given by $$r=(N_{SP}+512)/2048 \tag{1}$$

so that the value r may be changed in a range of from 384/2048 to 639/2048, with 512/2048=¼ as a center.

The time base counter 31 is a 10-bit binary counter, as an example, counting the count clocks $CK_T$ outputted from programmable frequency divider 40. The count value of the counter is incremented each time the counter is triggered by output $CK_T$. The counter 31 continues its binary counting operation as long as it is fed with the master clocks $CK_{MS}$. 1024 counts of the frequency-divided clocks $CK_T$ make up a complete cycle of the time base counter 31 which constitutes a cycle of an output pattern of the ultimate timing output, signal $S_{TG}$.

In operation, the microcomputer previously loads, responsive to the states (recording, playback or stop states) of a DAT, which is a rotary head type reproducing apparatus, 10-bit time-base data or 6-bit, timing pattern data, for example, in the timing pattern memory 32, from data bus 46 via data buffer 47 or from address bus 48 via address buffer 49 and selector 36.

On the other hand, master clocks $CK_{MS}$, supplied to input terminal 44, are frequency-divided by programmable frequency divider 40 to generate count clocks $CK_T$ which are transmitted to time base counter 31, which then effects a counting operation. In case of an overflow of counter 31, a reset signal is supplied via timing controller to event counter 35 which is thereby reset or cleared to zero. The output "0" from event counter 35 is supplied via selector 36 to timing pattern memory 32 for pointing out the first word (address "0" word) among the 32 words with address 0 to address 31 stored in timing pattern memory 32.

The 10-bit time base data of the 16-bit word having the address 0 in the timing pattern memory 32 are latched as an input to comparator 33, while 6-bit output data of the address 0 word are outputted at an output port via timing output buffer 37. The 6 bits of the 6-bit output represent six timing output signals $S_{TG0}$ to $S_{TG5}$.

The time base data latched as an input to comparator 33 are compared to an output of time base counter 31. At a time point when the output of the counter 31 performing the counting operation is coincident with the above-mentioned time base data, comparator 33 outputs a coincidence output which is transmitted via timing controller 34 to event counter 35 to increment the count value of the event counter 35. That is, directly following resetting, the output of event counter 35 is changed from "0" to "1" to point out the second word (address 1 word) of timing pattern memory 32, which second word is read out. In general, the word of the timing pattern memory 32 pointed out by the output of the incremented event counter 35 is read out and its 10-bit time base data is latched as an input to comparator 33, while its 6-bit output data is outputted at an output port via timing output buffer 37.

By repetition of the above described sequence of operations, outputs for each time base data stored in the timing pattern memory 32 for the six timing output signals $S_{TG0}$ to $S_{TG5}$ are produced. When the time base counter 31 counts 1024 count clocks $CK_T$ corresponding to the upper limit of counting capacity of the timing pattern memory 32 to cause its overflow, event counter 35 is reset, so that the above-described sequence of operations is repeated from the first word, that is the address 0 word, in the timing pattern memory 32.

Meanwhile, the overflow output from time base counter 31 is transmitted to a waveform shaping section 38, from which an interrupt signal is transmitted via output terminal 39 to the microcomputer. This interrupt signal causes an interrupt to the operation of the microcomputer to initiate execution of a predetermined interrupt program, such as a program of rewriting the storage contents of the timing pattern memory 32 for each revolution of the rotary head In this manner, when the operation of timing generation itself is controlled depending on the rotational velocity of the rotary head, it is possible, by employing control means, such as the microcomputer 8 shown in FIG. 2, or by properly setting the timing pattern, that is by previously setting a pattern directly controlling the display changeover operation or a variety of scanning operations as the above-mentioned timing pattern, to inhibit the display changeover operation of display devices, key-scanning operation or the sensor scanning operations during the time when the magnetic head is actually contacting the magnetic tape for actually reproducing the signals to prevent, noise from being introduced into the magnetic head or the amplifier.

It is to be noted that the present invention is not limited to the above-described embodiments. For example, the present invention may be applied to equipment other than the ultra-small sized DAT, such as a reproducing apparatus employing a video tape recorder (VTR) or a variety of rotary heads. Besides, the functions of the microcomputer 8 or the timing generator 7 may be changed arbitrarily. For example, the display changeover operations or the key or sensor scanning operations may be controlled directly from timing generator 7.

From the foregoing it is seen that the present invention provides a rotary head type reproducing apparatus in which the rotation of the rotary head is synchronized with the operation of timing generation of the timing generator and the operation of the input or the output changing the voltage or the current is inhibited during the time when the rotary head is contacted with the recording medium for reproducing the signals, so that it becomes possible to prevent the noise generated by the operation of changing the voltage or current from being intruded into the magnetic head or amplifier to deteriorate the playback signals for improving the error rate. The result is that shielding may be eliminated and the display section, switches or sensors may be mounted in close proximity to the rotary head for reducing the size or the weight of the apparatus.

What is claimed is:

1. A rotary head type reproducing apparatus for reproducing signals from a recording medium, using a rotary head intermittently in contact with said recording medium and having display elements that turn on and off, the apparatus comprising:

a timing generator producing a pulsed timing generating signal indicating rotation of the rotary head and contact of the rotary head with the recording medium;

synchronizing means for synchronizing rotation of said rotary head with said timing generating signal from said timing generator, and control means connected to said timing generator for controlling operation of said synchronizing means and the display elements and for inhibiting turning off the display elements that are on and for inhibiting turning on the display elements that are off when the rotary head is in contact with said recording medium during reproducing the signals from the recording medium.

2. The rotary head type reproducing apparatus as defined in claim 1 wherein the apparatus further includes a switch matrix for selecting operations of the apparatus and being scanned by said control means, and wherein a key scanning operation of the switch matrix is inhibited by said control means when the rotary head is in contact with the recording medium.

3. A rotary head type reproducing apparatus for reproducing signals from a recording medium, using a rotary head intermittently in contact with said recording medium, and having display elements that turn on and off, the apparatus comprising:

a timing generator producing a pulsed output signal indicating rotation of the rotary head and contact of the rotary had with the recording medium, synchronizing means for synchronizing rotation of said rotary head with the pulsed output signal from said timing generator, control means operative in response to timing output data for inhibiting turning off the display elements that are on and for inhibiting turning on the display elements that are off when the rotary head is in contact with said recording medium and reproducing the signals therefrom, wherein said control means comprises frequency dividing means fed with clock signals and having a frequency dividing ratio thereof changed depending on said pulsed output signal from said timing generator, a time base counter fed with an output of said frequency dividing means and adapted for outputting time base data, a timing pattern memory storing predetermined time base data corresponding to said time base data from said time base counter and respective timing output data, a comparator for comparing the time base data from said time base counter with said predetermined time base data from said timing pattern memory, and an event counter responsive to an output of said comparator and producing a memory control signal fed to said timing pattern memory, wherein one of said timing output data selected by said memory control signal from said event counter is read out from said timing pattern memory and fed to said control means.

* * * * *